US007418548B2

(12) United States Patent  (10) Patent No.: US 7,418,548 B2
Corrado et al.  (45) Date of Patent: Aug. 26, 2008

(54) DATA MIGRATION FROM A NON-RAID VOLUME TO A RAID VOLUME

(75) Inventors: Francis R. Corrado, Newton, MA (US); Daniel Nemiroff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 10/716,932

(22) Filed: Nov. 18, 2003

(65) Prior Publication Data

US 2005/0108730 A1    May 19, 2005

(51) Int. Cl.
    *G06F 12/00* (2006.01)
(52) U.S. Cl. .................................................. 711/114
(58) Field of Classification Search ........................ None
    See application file for complete search history.

(56) References Cited

U.S. PATENT DOCUMENTS

| 5,615,352 | A  | * | 3/1997 | Jacobson et al. | ............. | 711/114 |
| 6,347,359 | B1 | * | 2/2002 | Smith et al. | .................. | 711/114 |
| 6,732,230 | B1 | * | 5/2004 | Johnson et al. | ............. | 711/114 |
| 6,877,011 | B2 | * | 4/2005 | Jaskiewicz | .................. | 707/102 |
| 6,898,667 | B2 | * | 5/2005 | Umberger et al. | ............ | 711/114 |
| 7,032,086 | B2 | * | 4/2006 | Merchant | ..................... | 711/156 |
| 2002/0156987 | A1 | * | 10/2002 | Gajjar et al. | ................. | 711/203 |
| 2003/0069886 | A1 | * | 4/2003 | Jaskiewicz | .................... | 707/10 |
| 2004/0172503 | A1 | * | 9/2004 | Merchant | ..................... | 711/114 |
| 2005/0086429 | A1 | * | 4/2005 | Chatterjee et al. | ............ | 711/114 |
| 2005/0102603 | A1 | * | 5/2005 | Tapper et al. | ................ | 714/770 |

* cited by examiner

*Primary Examiner*—Kevin Verbrugge
(74) *Attorney, Agent, or Firm*—Christopher K. Gagne; Caroline M. Fleming

(57) ABSTRACT

In one embodiment, a method is provided that may include, issuing a read request to request reading of at least one portion of data stored in a first storage device and issuing a write request to request writing of the at least one portion of the data into a second storage device or at least one location in the first storage device. The at least one location may be comprised in a volume of a redundant array of inexpensive disks (RAID), the at least one portion of data being stored in a non-RAID volume in the first storage device. The method of this embodiment also may include, if a request to access one or more other portions of the data is received and/or issued by one or more operating system processes while the reading and/or the writing is occurring, issuing an access request to request accessing of the one or more other portions of the data. Of course, many modifications are possible without departing from this embodiment.

23 Claims, 2 Drawing Sheets

DATA MIGRATION FROM A NON-RAID VOLUME TO A RAID VOLUME

FIELD

This disclosure relates to data migration.

BACKGROUND

A conventional data storage system initially may include a computer node coupled to a single mass storage device that stores data. A processor in the node executes one or more operating system processes that permit a human to access the data stored in the mass storage device. If it is later desired to distribute the data that is initially stored in the single mass storage device among multiple mass storage devices in accordance with a redundant array of inexpensive disks (RAID) technique, a conventional data migration technique is employed in which the data is copied, from the initial mass storage device, into a backup mass storage device. Thereafter, one or more additional mass storage devices are added to the system, and stripes of the data stored in the backup device are copied, from the backup device, into the initial mass storage device and the one or more additional mass storage devices, in accordance with the RAID technique.

Unfortunately, in accordance with this conventional data migration technique, while the technique is being performed, the one or more operating system processes may be unable to access the data. Disadvantageously, this may result in the human user being unable to access the data while the conventional data migration technique is being performed. Also unfortunately, this conventional technique utilizes a backup mass storage device. Disadvantageously, this increases the cost of implementing this conventional technique.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
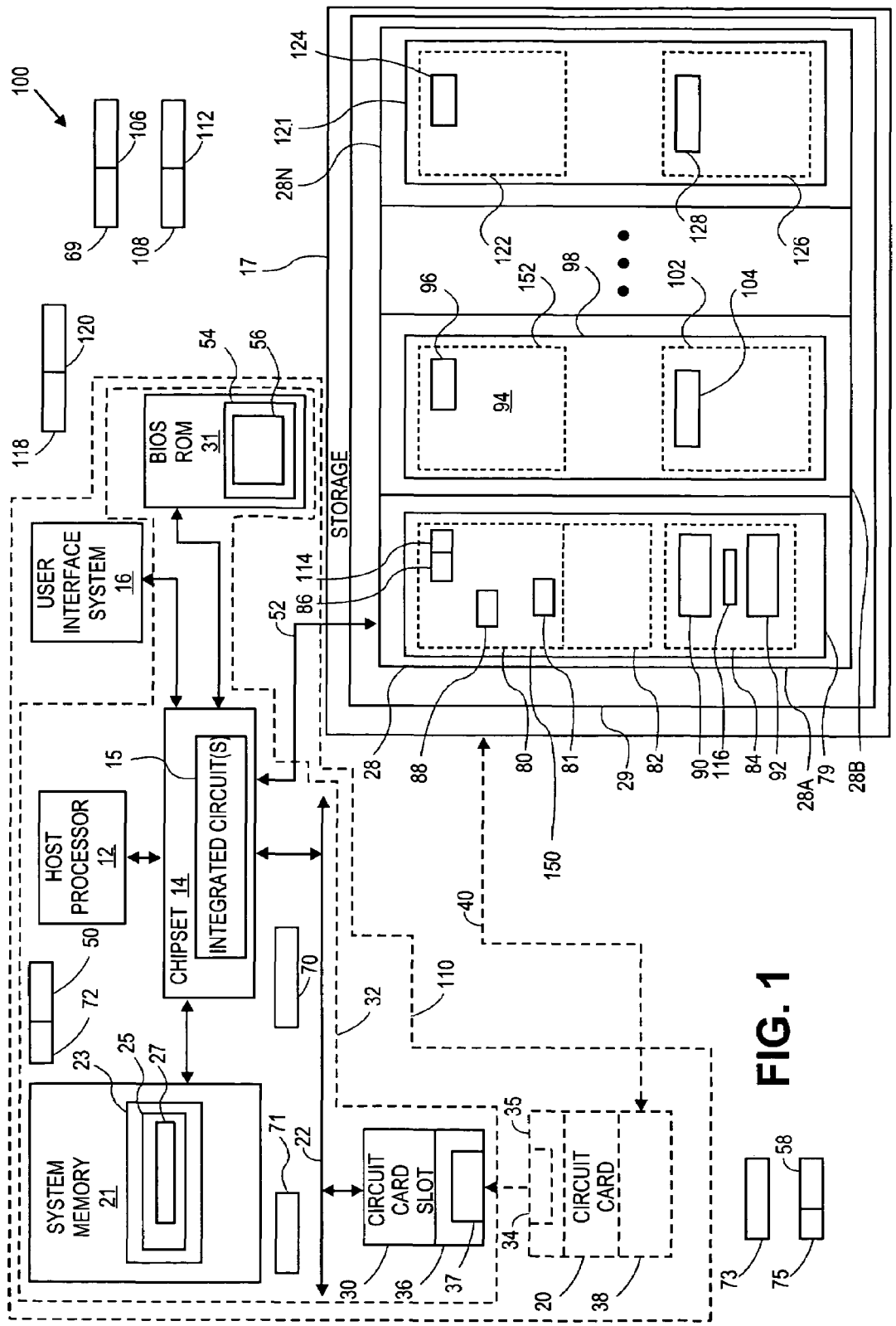
FIG. 1 is diagram that illustrates a system embodiment.

FIG. 1 illustrates a system embodiment 100. System 100 may include operative circuitry 110 that may include a host processor 12 coupled to a chipset 14. Host processor 12 may comprise, for example, an Intel® Pentium® IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, system memory 21 and user interface system 16 to each other and to a bus system 22. Chipset 14 may also include an input/output (I/O) bridge/hub system (not shown) that may couple the host bridge/bus system to bus 22. Chipset 14 may comprise one or more integrated circuits 15. As used herein, "integrated circuit" means one or more semiconductor devices and/or microelectronic devices, such as, for example, one or more semiconductor integrated circuit chips. User interface system 16 may comprise, e.g., a keyboard, pointing device, and display system that may permit a human user to input commands to, and monitor the operation of, system 100.

System 100 also may comprise a basic input/output (I/O) system (BIOS) read only memory (ROM) 31 that may be coupled to one or more integrated circuits 15. BIOS ROM 31 may comprise machine-executable firmware BIOS program instructions 54. These instructions 54 may be executable by host processor 12.

Bus 22 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, including, for example, other or later developed versions of the PCI Express™ or PCI-X buses, without departing from this embodiment.

System embodiment 100 may comprise storage 17. Storage 17 may comprise one or more storage devices 28. In this embodiment, initially, one or more storage devices 28 may comprise, for example, storage device 28A; however, as is discussed below, thereafter, one or more storage devices 28 may comprise a plurality of storage devices 28A, 28B, . . . 28N. Each of these storage devices 28A, 28B, . . . 28N may be or comprise a respective mass storage device. Storage 17 may be coupled to one or more integrated circuits 15 of chipset 14 via one or more communication media 52. As used herein, the terms "storage" and "storage device" may be used interchangeably to mean one or more apparatus into, and/or from which, data and/or commands may be stored and retrieved, respectively. Also, as used herein, the term "mass storage device" means one or more storage devices capable of nonvolatile storage of data and/or commands, and, for example, in this embodiment, may include, without limitation, one or more magnetic, optical, and/or semiconductor storage devices. As used herein, a "communication medium" means a physical entity through which electromagnetic energy may be transmitted and/or received. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

Processor 12, system memory 21, chipset 14, bus 22, BIOS ROM 31, and circuit card slot 30 may be comprised in operative circuitry 110. Processor 12, system memory 21, chipset 14, bus 22, BIOS ROM 31, and circuit card slot 30 also maybe comprised in a single circuit board, such as, for example, a system motherboard 32. Operative circuitry 110 may comprise motherboard 32.

In this embodiment, one or more integrated circuits 15 may exchange data and/or commands with storage 17, via one or more media 52 in accordance with, e.g., Serial Advanced Technology Attachment (S-ATA) protocol. In accordance with this embodiment, if one or more integrated circuits 15 and storage 17 exchange data and/or commands in accordance with S-ATA protocol, the S-ATA protocol may comply or be compatible with the protocol described in "Serial ATA: High Speed Serialized AT Attachment," Revision 1.0, published on Aug. 29, 2001 by the Serial ATA Working Group (hereinafter, the "S-ATA Specification"), and/or other and/or later developed versions of the S-ATA Specification. Of course, alternatively, one or more integrated circuits 15 may exchange data and/or commands with storage 17 in accordance with other and/or additional communication protocols, without departing from this embodiment.

Depending upon, for example, whether bus 22 comprises a PCI Express™ bus or a PCI-X bus, circuit card slot 30 may comprise, for example, a PCI Express™ or PCI-X bus compatible or compliant expansion slot or interface 36. Interface 36 may comprise a bus connector 37.

Without departing from this embodiment, instead of being coupled to, and exchanging data and/or commands with one or more integrated circuits 15, storage 17 may be coupled to operative circuitry 38 of host bus adapter (HBA) circuit card 20 (shown in ghost in FIG. 1). If system 100 includes circuit card 20, card 20 may include a bus expansion interface 35 that may comprise a bus connector 34. In this alternate arrangement, connector 37 may be electrically and mechanically mated with bus connector 34.

Also in this alternate arrangement, slot 30 and card 20 may be constructed to permit card 20 to be inserted into slot 30. When card 20 is properly inserted into slot 30, connectors 34 and 36 may become electrically and mechanically coupled to each other. When connectors 34 and 36 are so coupled to each other, circuitry 38 may become electrically coupled to bus 22 and may exchange data and/or commands with system memory 21, host processor 12, and/or user interface system 16 via bus 22 and chipset 14.

System memory 21 each comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 21 may comprise other and/or later-developed types of computer-readable memory.

Machine-readable program instructions may be stored in memory 21 and BIOS ROM 31. These instructions may be accessed and executed by processor 12. When executed by processor 12, these instructions may result in processor 12 and/or circuitry 110 performing the operations described herein as being performed by processor 12 and/or circuitry 110.

During operation of circuitry 110, one or more program processes 23 may reside in memory 21 and be executed by processor 12. One or more processes 23 may comprise, for example, one or more operating system processes 25, such as, in this embodiment, one or more Microsoft® Windows® XP operating system processes spawned and/or generated by execution of Microsoft® & Windows® XP operating system commercially available from Microsoft Corporation of Redmond, Wash. Of course, without departing from this embodiment, one or more processes 23 and/or 25 may comprise other types of processes, including, for example, other types of operating system processes. One or more processes 25 may comprise one or more kernel mode drivers 27. The execution of one or more processes 23, 25 and/or 27 may permit and/or facilitate, for example, a human user (not shown) to control and monitor, using system 16, operation of storage 17.

Storage devices 28A, 28B . . . 28N may comprise total usable storage space 79, 98, 121, respectively. Initially, in this embodiment, a portion of usable storage space 79 in storage device 28A may contain user data 80. The amount of user data 80 stored in usable storage space 79 may be less than the total usable storage space 79 comprised in storage device 28A. Of course, the number of storage devices 28A, 28B, . . . 28N in storage 17 may vary without departing from this embodiment. Also initially, in this embodiment, each of the other storage devices 28B . . . 28N comprised in storage devices 28 (e.g., other than storage device 28A) may not comprise user data.

Figure 2:
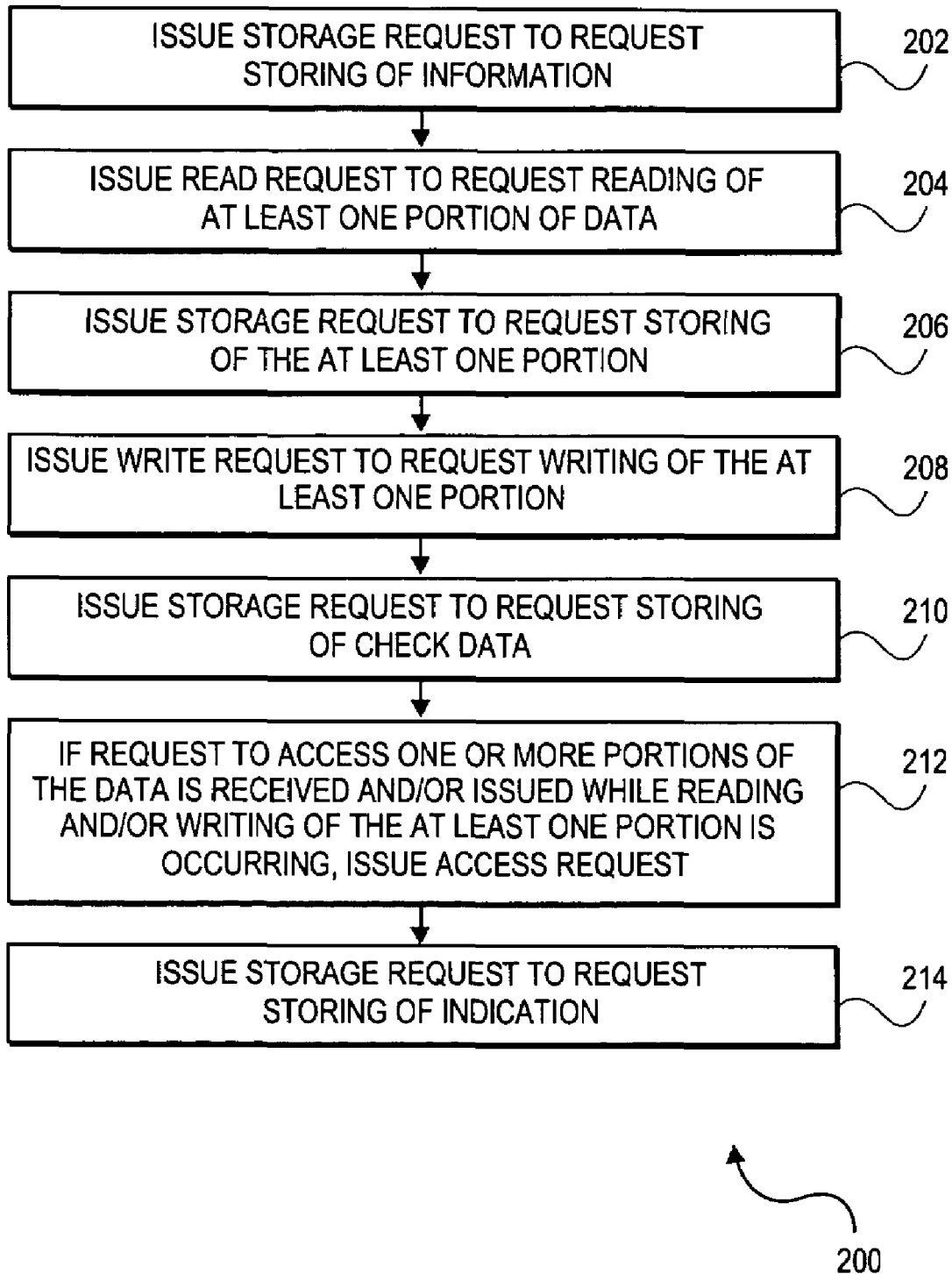
FIG. 2 is a flowchart that illustrates operations that may be performed according to an embodiment.

With reference now being made to FIG. 2, operations 200 that may be performed in system 100 in accordance with an embodiment will be described. In this embodiment, after, for example, a reset and/or restart of processor 12, system 100, and/or circuitry 110, a human user (not shown) of system 100 may issue a request to one or more processes 23 via user interface system 16 that data 80 stored in storage device 28A be stored in a plurality of storage devices (e.g., storage devices 28A, 28B and 28N) in storage 17, in accordance with a RAID technique. Initially, prior to the issuance of this request, data 80 may not be stored in storage device 28A in accordance with a RAID technique. For example, prior to the issuance of this request, data 80 may be stored in a non-RAID volume in storage device 28A.

In response, at least in part, to this request, current state and/or value of one or more variables, execution of program instructions, and/or data structures comprised in, utilized by, and/or operated upon by one or more processes 23, 25, and/or 27 may be altered such that execution of one or more processes 23, 25, and/or 27 by processor 12 may result in processor 12 executing one or more program instructions 56 comprised in BIOS instructions 54 in BIOS ROM 31. The execution of these one or more program instructions 56 by processor 12 may result in processor 12 issuing a request to storage device 28A to read configuration information stored in storage device 28A that indicates, at least in part, the amount of free space comprised in total usable storage space 79. In this embodiment, "free space" comprises storage space that does not store user data, such as, for example, initially in this embodiment, free space 84 that does not store user data 80. If the amount of free space 84 is at least equal to an amount of free space sufficient to store information 90, indication 92, and at least one portion (e.g., one or more portions 86) of data 80 (e.g., at one or more locations 116), the execution of one or more instructions 56 by processor 12 may result in processor 12 generating and issuing to storage device 28A storage request 70 to request storing in at least one of storage devices 28A, 28B, and/or 28N, information, describing, at least in part, configuration of a RAID to be comprised in storage 17, as illustrated by operation 202 in FIG. 2. Conversely, if the amount of free space 84 is not sufficient to store information 90, indication 92, and one or more portions 86 of data 80, the execution of one or more instructions 56 by processor 12 may result in processor 12 signaling system 16. This may result in system 16 indicating to the human user that system 100 is unable to execute the user's request that data 80 be stored in a plurality of storage devices (e.g., storage devices 28A, 28B and 28N) in storage 17, in accordance with a RAID technique.

If, however, processor 12 issues storage request 70 to storage device 28A, this may result in storage 28A storing in space 84 information 90, storage 28B storing in space 102 information 104, and/or storage 28N storing in space 126 information 128. In this embodiment, information 90 may be or comprise configuration information that may describe, at least in part, the present configuration of storage 17 and the configuration of a RAID 29 that will exist in storage 17 after user data 80 has been distributed, in accordance with the RAID technique requested by the human user, among the plurality of storage devices 28A, 28B, . . . 28N. For example, in this embodiment, configuration information 90 may describe, at least in part, a RAID configuration (e.g., of RAID 29) that is expected to exist in storage 29 as a result of execution the user's request that data 80 be stored in a plurality of storage devices (e.g., storage devices 28A, 28B and 28N) in storage 17, in accordance with the RAID technique. Depending upon, for example, the RAID technique requested by the user, the RAID level that may be implemented by RAID 29 may be 0, 1, or greater than 1. Depending upon, for example, the RAID level implemented in RAID 29, the number of storage devices comprised in RAID 29 may vary so as to permit the number of storage devices to be at least sufficient to implement the RAID level implemented in RAID 29.

For example, in this embodiment, configuration information 90 may comprise RAID configuration information that may include metadata that may identify, indicate, and/or specify, for example, storage devices 28A, 28B and 28N and/or volumes to be comprised in RAID 29, physical and/or logical parameters (e.g., total size, available storage space, location, addresses, blocks, partitions, and files) of each such storage device and/or volume, current state of each storage device and/or volume (e.g., whether each such mass storage device and/or volume currently has not failed, has failed at least in part, or is expected to fail within a predetermined period of time, and/or error checking information from which such state may be determined), and the respective serial numbers of each such storage device and/or volume. Additionally, in this embodiment, configuration information 90 may comprise metadata that may identify, indicate, and/or specify, for example, the present storage volume(s) comprised in storage device 28A, present physical and/or logical parameters (e.g., total size, available storage space, location, addresses, blocks, partitions, and files) of storage device 28A and/or volume(s) presently comprised in storage 28A, and current state of volume(s) presently comprised in storage 28A. As used herein, "configuration" of storage means type, nature, arrangement, one or more components, one or more properties, and/or one or more characteristics of the storage and/or of one or more components of the storage. Also as used herein, a "storage volume" may comprise one or more physical and/or logical volumes. Information 104 and/or information 128 may comprise respective copies of information 90 or of the RAID configuration information comprised in information 90.

In this embodiment, after RAID 29 is implemented in storage 17 in accordance with configuration information 90, storage 17 may comprise a RAID volume that may comprise storage spaces 150, 152, and 122 in storage device 28A, 28B, and 28N respectively. Space 80 may comprise space 150 and adjoining space 82.

Thereafter, the execution of one or more instructions 56 by processor 12 may result in processor 12 issuing a read request 71 to request reading of one or more portions 86 of data 80 in storage device 28A, as illustrated by operation 204 in FIG. 2. In this embodiment, one or more portions 86 may have a size that is equal to, for example, one or more stripes, tracks, addresses, and/or blocks in RAID 29 and/or storage 28A. For example, one or more portions 86 may have a size that comprises 64 kilobytes, although other sizes are possible without departing from this embodiment. One or more portions 86 may be located at one or more locations in storage device 28A, such as, for example, one or more beginning stripes, tracks, addresses, and/or blocks in storage 28A and/or in a storage volume comprised in storage device 28A. In response, at least in part, to request 71, storage device 28A may read one or more portions 86 of data 80 and may provide one or more portions 86 of data 80 to processor 12.

Thereafter, in this embodiment, the execution of one or more instructions 56 by processor 12 may result in processor 12 issuing a write request 72 to storage 17 to request writing of one or more portions 86 of data 80 into one of the other storage devices 28B or 28N to be comprised in RAID 29 (e.g., storage device 28B), or into one or more locations (e.g., one or more locations 88) comprised in the storage space 150 comprised in the RAID storage volume that is to be comprised in storage device 28A, as illustrated by operation 208 in FIG. 2. As part of operation 208, processor 12 may select one or more locations 96 or 88 based upon and/or in accordance with, at least in part, the RAID configuration information comprised in information 90. In this embodiment, write request 72 may comprise a copy 50 of one or more portions 86 of user data 80. In response, at least in part, to write request 72, storage device 28B may store copy 50 of one or more portions 86 of user data 80 in one or more locations 96, or storage device 28A may store copy 50 of one or more portions 86 in one or more locations 88.

However, if, prior to execution of operation 208, a part 114 of one or more portions 86 of data 80 is located, in part, in the one or more locations into which one or more portions 86 of data 80 are to be written as a result of operation 208, the execution of one or more instructions 56 by processor 12 may result in processor 12 issuing to storage 17, prior to execution of operation 208, a storage request 75 to request that the at least one portion 86 of data 80 be stored in at least one other location (e.g., one or more reserved locations 116 in space 84) in storage device 28A. Request 75 may include a copy 58 of one or more portions 86 of data 80. In response, at least in part, to request 75, storage device 28A may store in one or more locations 116 copy 58 of one or more portions 86 of data 80. Thereafter, indication information 92 (described below) may be stored in space 84 that indicates, at least in part, the next one or more other portions of data 80 to be read in response to the user's request. Thereafter, operation 208 may be executed, with copy 50 comprising copy of data 58 stored in one or more locations 116.

After, or contemporaneous with, at least in part, the execution of operation 208, the execution of one or more instructions 56 by processor 12 may result in processor 12 generating and issuing a storage request 118 to storage 17 to request that storage device 28N store in one or more locations 124 in the portion 122 of storage device 28N that is to be comprised in the RAID storage volume in RAID 29, check data 120, as illustrated by operation 210. As used herein, "check data" means first data generated based at least in part upon second data and from which the second data may be regenerated at least in part. If the RAID level implemented in RAID 29 is equal to zero or equal to one, the check data may be absent from RAID 29, and operation 210 may not be carried out in this embodiment. Alternatively, if the RAID level implemented in RAID 29 is greater than one, the check data may comprise parity data. In this embodiment, processor 12 may utilize conventional RAID techniques to generate the check data based at least in part upon the one or more portions 86 of user data 80. Also in this embodiment, processor 12 may select the one or more locations 124 based, at least in part, upon the RAID configuration information comprised in information 90, 104, and/or 128.

In this embodiment, if a request to access one or more other portions (e.g., one or more portions 81) of user data 80 is received and/or issued by one or more operating system processes 23 (e.g., by one or more processes 27) while the reading by storage device 28A of one or more portions 86 of data 80 is occurring in response, at least in part, to read request 71, and/or while the writing by storage device 28A or by storage device 28B of one or more portions 86 is occurring in response, at least in part, to write request 72, processor 12 may generate and issue to storage 17 an access request 69 that may request accessing of the one or more other portions 81 of user data 80, as illustrated by operation 212. In this embodiment, "accessing" may comprise reading and/or writing of data. For example, in this embodiment, while this reading and/or writing of one or more portions 86 of data 80 is occurring, the human user of system 100 may issue, via user interface system 16, to one or more operating system processes 23 (e.g., one or more driver processes 27) a request to access one or more portions 81 of data 80. In response, at least in part, to this request issued by the user, one or more operating system processes (e.g., one or more driver processes 27) may issue (e.g., in this embodiment, the execution of these one or more operating system processes by processor 12 may result in processor 12 issuing), while this reading and/or writing of one or more portions 86 of data 80 is occurring, access request 69 to storage 17 to request accessing of one or more portions 81 of data 80 in accordance with the access request issued by the user. In response, at least in part, to request 69, storage device 28A may access, while the reading and/or writing of one or more portions 86 of data 80 is occurring, the one or more portions 81 of data 80 in accordance with the access request issued by the user. For example, if the access request issued by the user comprises a write request to write specified data, the access request 69 issued as a result of operation 212 may comprise a copy 106 of this' specified data, and in response, at least in part, to request 69, storage device 28A may overwrite one or more portions 81 of user data 80 with this copy 106 of the specified data. However, if the access request issued by the user comprises a read request to read one or more portions 81 of user data 80, in response, at least in part, to request 69, storage device 28A may read one or more portions 81 of user data 80 and provide a copy of the one or more portions 81 of user data 80 to processor 12.

After the writing by storage device 28A or by storage device 28B of one or more portions 86 of user data 80 has occurred in response, at least in part, to write request 72, the execution of one or more instructions 56 may result in processor 12 issuing a storage request 108 to storage 17 to request that storage device 28A and/or storage device 28B store indication 92 that indicates, at least in part, at least one additional portion (not shown) of the data 80 to be next read and/or written, as illustrated by operation 214 in FIG. 2. For example, as part of operation 214, in this embodiment, if user data 80 comprises one or more additional portions of data that are not comprised in one or more portions 86 of data 80, the execution of one or more instructions 56 by processor 12 may result in processor 12 selecting one or more additional portions of data 80 to be next read and written in order to permit the selected one or more additional portions of data 80 to be stored in storage 17 in accordance with the RAID configuration information in information 90, 104, and/or 128, in order to continue to satisfy the user's request that data 80 initially stored in storage device 28A be stored in a plurality of storage devices in storage 17, in accordance with a RAID technique. After selecting these one or more additional portions of data 80 to be next read and/or written, processor 12 may issue storage request 108 to storage 17. Request 108 may comprise indication 112 that may indicate, at least in part, these one or more additional portions of data 80 selected by processor 12. In response, at least in part, to request 108, storage device 28A may store indication 112, as indication 92 in space 84, and/or storage device 28B may store indication 112 in space 102.

Also as part of operation 214, after the writing by storage device 28A or by storage device 28B of one or more portions 86 of user data 80 has occurred in response, at least in part, to write request 72, the execution of one or more instructions 56 may result in processor 12 issuing a write request to storage 17 to request that information 90, 104, and/or 128 be modified to reflect this writing of one or more portions 86 of user data 80. For example, in this embodiment, information 90, 104, and/or 128 may be modified to indicate that one or more portions 86 of user data 80 presently are located at one or more locations 88 or one or more locations 96, depending where the one or more portions 86 of user data 80 were written in response, at least in part, of request 72. Thereafter, future accesses of data (e.g., one or more portions 86 of user data 80) may be based upon and/or in accordance with, at least in part, information 90, 102, and/or 128, as thus modified.

Thereafter, in this embodiment, the execution of one or more instructions 56 by processor 12 may result in operations 204, 206, 208, 210, 212, and 214 being repeated one or more additional times, but with these repeated operations being directed to, for example, among other things, storing the one or more additional portions of data 80 (e.g., other than one or more portions 86 of data 80) among a plurality of storage devices in storage 17 in accordance with the user's request to store data 80 in accordance with a RAID technique. Prior to the initial execution of operation 204, in this embodiment, indication 92 may indicate, at least in part, one or more portions 86.

In this embodiment, indication 92 and information 90, 104, and 128 may be stored in one or more mass storage devices comprised in storage 17. Also in this embodiment, if an interruption in execution of operations 204, 206, 208, 210, and 212 occurs, for example, as a result of a failure of actuating electrical power being supplied to system 100 and/or a reset of system 100, the execution of one or more instructions 56 by processor 12 may result in processor 12 recommencing operations 200, upon re-supply of such power and/or after the resetting of system 100, with execution of operation 204 based upon and/or in accordance with, at least in part, information 90, 104, and/or 128, and also based upon and/or in accordance with, at least in part, indication 92. Thereafter, the other operations comprised in operations 200 may be execution in the manner described previously, also based upon and/or in accordance with, at least in part, indication 92 and information 90, 104, and/or 128. For example, in the case of operation 204, execution of operation 204 may result in the issuing of a read request to read one or more portions of data 80 indicated, at least in part, by indication 92 as being one or more portions of data 80 to be next read. Also, for example, in the case of operation 206, execution of operation 206 may result in the issuing of a write request to write these one or more portions of data 80 in accordance with the RAID configuration information comprised in information 90, 104, and/or 128. Advantageously, in this embodiment, as a result, at least in part, of storing indication 92 and information 90, 104, and/or 128 in one or more mass storage devices comprised in storage 17, in the event of such power failure and/or resetting of system 100, operations 204, 206, 208, 210, and 212 may be carried out without loss of user data 80, for example, as a result of erroneously overwriting one or more portions of user data 80. Also advantageously, in this embodiment, as a result, at least in part, of storing indication 92 and information 90, 104, and/or 128 in one or more mass storage devices comprised in storage 17, in the event of such power failure and/or resetting of system 100, operations 204, 206, 208, 210, and 212 maybe carried out such that all of the user data 80 may be appropriately stored in storage 17, in accordance with the RAID configuration information comprised in information 90, 104, and/or 128, thereby permitting data 80 to be stored among a plurality of storage devices in storage 17 in accordance with a RAID technique, in accordance with the user's request.

Thus, one system embodiment may comprise a circuit board comprising ROM to store instructions, and circuitry capable of executing the instructions. The execution of the instructions by the circuitry may result in issuing a read request to request reading of at least one portion of data stored in a first storage device. The execution of the instructions by the circuitry also may result in issuing a write request to request writing of the at least one portion of the data into a second storage device or at least one location in the first storage device. The at least one location may be comprised in a volume of a RAID. Also in this system embodiment, if a request to access one or more other portions of the data is at least one of received and issued by one or more operating system processes while the reading and/or writing is occurring, issuing an access request to request accessing of the one or more other portions of the data.

Thus, in this system embodiment, while the reading and/or writing are being performed, the one or more operating system processes may be able to access the data. Advantageously, in this system embodiment, this may permit a human user to be able to access the data while the data is being distributed among the storage devices in order to produce the RAID volume. Also advantageously, these features of this system embodiment may permit the data to be distributed among the storage devices in this system embodiment without having to utilize a backup mass storage device, as in the prior art. Further advantageously, this may decrease the cost of producing a RAID volume in accordance with this system embodiment, compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   issuing a read request to request reading of at least one portion of data stored in a first storage device;
   issuing a write request to request writing of the at least one portion of the data into one of a second storage device and at least one location in the first storage device, the at least one location being comprised in a volume of a redundant array of inexpensive disks (RAID), the data being stored in a non-RAID volume in the first storage device;
   in response, at least in part, to a request to access one or more other portions of the data stored in the non-RAID volume at least one of received and issued by one or more operating system processes while at least one of the reading and the writing is occurring, issuing an access request to request accessing of the one or more other portions of the data and accessing the one or more other portions of the data while the at least one of the reading and the writing is occurring;
   after the writing, issuing a storage request to request storing in the first storage device and in the second storage device of an indication, at least in part, of at least one other portion of the data to be next read; and
   issuing another storage request to request storage in the first storage device and in the second storage device of configuration information indicating, at least in part, parameters of the non-RAID volume and of the RAID volume.

2. The method of claim 1, further comprising:
   issuing a storage request to request storing, in a third storage device, of check data generated, based at least at in part upon the at least one portion of the data.

3. The method of claim 2, wherein:
   the check data comprises parity data.

4. The method of claim 1, wherein:
   the first storage device and the second storage device comprise one or more mass storage devices.

5. The method of claim 1, wherein:
   a part of the at least one portion of the data is stored in the at least one location; and
   the method further comprises, prior to the writing, issuing a storage request to request storing of the at least one portion of the data in at least one other location in the first storage device.

6. An apparatus comprising:
   circuitry capable of:
   issuing a read request to request reading of at least one portion of data stored in a first storage device;
   issuing a write request to request writing of the at least one portion of the data into one of a second storage device and at least one location in the first storage device, the at least one location being comprised in a volume of a redundant array of inexpensive disks (RAID), the data being stored in a non-RAID volume in the first storage device;
   in response, at least in part, to a request to access one or more other portions of the data stored in the non-RAID volume at least one of received and issued by one or more operating system processes while at least one of the reading and the writing is occurring, issuing an access request to request accessing of the one or more other portions of the data and accessing the one or more other portions of the data while the at least one of the reading and the writing is occurring;
   after the writing, issuing a storage request to request storing in the first storage device and in the second storage device of an indication, at least in part, of at least one other portion of the data to be next read; and
   issuing another storage request to request storage in the first storage device and in the second storage device of configuration information indicating, at least in part, parameters of the non-RAID volume and of the RAID volume.

7. The apparatus of claim 6, wherein:
   the circuitry is also capable of issuing a storage request to request storing, in a third storage device, of check data generated, based at least at in part upon the at least one portion of the data.

8. The apparatus of claim 7, wherein:
   the check data comprises parity data.

9. The apparatus of claim 6, wherein:
   the first storage device and the second storage device comprise one or more mass storage devices.

10. The apparatus of claim 6, wherein:
    a part of the at least one portion of the data is stored in the at least one location; and the circuitry is also capable of, prior to the writing, issuing a storage request to request storing of the at least one portion of the data in at least one other location in the first storage device.

11. An article comprising:
a storage medium having stored therein instructions that when executed by a machine result in the following:
issuing a read request to request reading of at least one portion of data stored in a first storage device;
issuing a write request to request writing of the at least one portion of the data into one of a second storage device and at least one location in the first storage device, the at least one location being comprised in a volume of a redundant array of inexpensive disks (RAID), the data being stored in a non-RAID volume in the first storage device; and
in response, at least in part, to a request to access one or more other portions of the data stored in the non-RAID volume at least one of received and issued by one or more operating system processes while at least one of the reading and the writing is occurring, issuing an access request to request accessing of the one or more other portions of the data and accessing the one or more other portions of the data while the at least one of the reading and the writing is occurring
after the writing, issuing a storage request to request storing in the first storage device and in the second storage device of an indication, at least in part, of at least one other portion of the data to be next read; and
issuing another storage request to request storage in the first storage device and in the second storage device of configuration information indicating, at least in part, parameters of the non-RAID volume and of the RAID volume.

12. The article of claim 11, wherein the instructions when executed also result in:
issuing a storage request to request storing, in a third storage device, of check data generated, based at least at in part upon the at least one portion of the data.

13. The article of claim 12, wherein:
the check data comprises parity data.

14. The article of claim 11, wherein:
the first storage device and the second storage device comprise one or more mass storage devices.

15. The article of claim 11, wherein:
a part of the at least one portion of the data is stored in the at least one location; and
the instructions when executed by the machine also result in, prior to the writing, issuing a storage request to request storing of the at least one portion of the data in at least one other location in the first storage device.

16. A system comprising:
a circuit board comprising read only memory (ROM) to store instructions; and
circuitry capable of executing the instructions, execution of the instructions by the circuitry resulting in:
issuing a read request to request reading of at least one portion of data stored in a first storage device;
issuing a write request to request writing of the at least one portion of the data into one of a second storage device and at least one location in the first storage device, the at least one location being comprised in a volume of a redundant array of inexpensive disks (RAID), the data being stored in a non-RAID volume in the first storage device;
in response, at least in part, to a request to access one or more other portions of the data stored in the non-RAID volume at least one of received and issued by one or more operating system processes while at least one of the reading and the writing is occurring, issuing an access request to request accessing of the one or more other portions of the data while at least one of the reading and the writing is occurring;
after the writing, issuing a storage request to request storing in the first storage device and in the second storage device of an indication, at least in part, of at least one other portion of the data to be next read; and
issuing another storage request to request storage in the first storage device and in the second storage device of configuration information indicating, at least in part, parameters of the non-RAID volume and of the RAID volume.

17. The system of claim 16, wherein:
the circuit board also comprises a chipset coupled to the processor and to the ROM.

18. The system of claim 17, wherein:
the circuit board also comprises a bus and a circuit card slot coupled to the bus, the slot being coupled to the processor via the chipset.

19. The system of claim 16, wherein:
the instructions are comprised in basic input/output system (BIOS) instructions stored in the ROM.

20. The method of claim 1, wherein:
the RAID configuration information permits, at least in part, determination of at least one of storage device failure-related information and volume failure-related information.

21. The apparatus of claim 6, wherein:
the RAID configuration information permits, at least in part, determination of at least one of storage device failure-related information and volume failure-related information.

22. The article of claim 11, wherein:
the RAID configuration information permits, at least in part, determination of at least one of storage device failure-related information and volume failure-related information.

23. The system of claim 16, wherein:
the RAID configuration information permits, at least in part, determination of at least one of storage device failure-related information and volume failure-related information.

* * * * *